May 21, 1968     F. J. HANZALEK     3,384,550
NUCLEAR STEAMPLANT METHOD AND APPARATUS
Filed Dec. 29, 1966
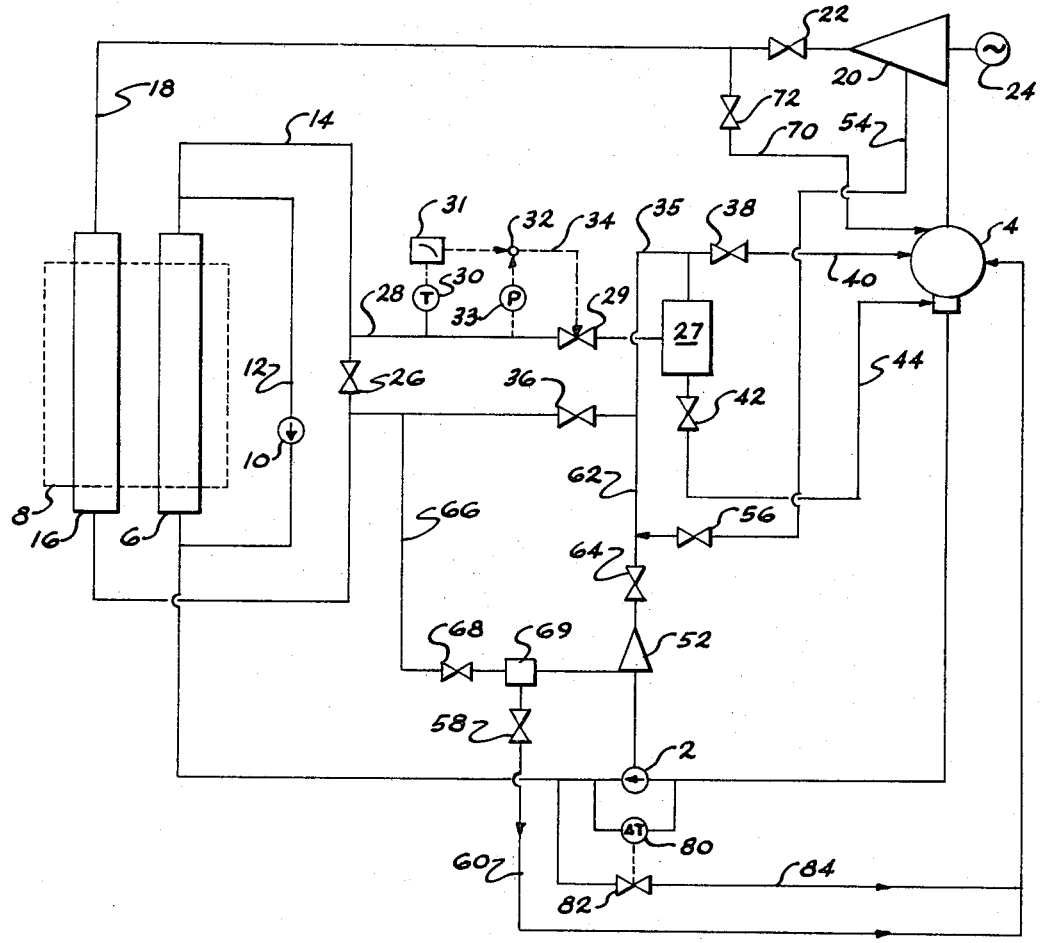
INVENTOR
FREDERICK J. HANZALEK
By E. L. Kochey
AGENT United States Patent Office 3,384,550
Patented May 21, 1968

3,384,550
NUCLEAR STEAMPLANT METHOD
AND APPARATUS
Frederick J. Hanzalek, Suffield, Conn., assignor to Combustion Engineering, Inc., Windsor, Conn., a corporation of Delaware
Filed Dec. 29, 1966, Ser. No. 605,866
17 Claims. (Cl. 176—56)

ABSTRACT OF THE DISCLOSURE

A nuclear powerplant system to facilitate decay heat removal during shutdown operation, without requiring auxiliary power sources for circulation through the reactor using a super-critical pressure reactor having a water heating pass and a steam superheating pass. A turbine drive feed pump supplying water to the reactor. A valve in the through-flow path intermediate the water heating and steam heating passes and a flash tank with valved inlet and outlet lines in parallel with the valve. A valved pipe from the flash tank to the feed pump turbine for driving the feed pump with flash tank steam during decay heat removal and for supplying cooling steam to the superheating pass.

BACKGROUND OF THE INVENTION

This invention relates to nuclear steamplant operation at supercritical pressure where the reactor includes a steam superheating pass and in particular to a method and apparatus for starting up and shutting down such plants. When a nuclear reactor is rapidly shut down, it does not stop producing heat. The fissioning from delayed neutrons and the energy of the radioactivity in the core materials continue developing decay heat which tapers off with time. This decay heat must be removed to prevent destruction of the reactor core. The concern with the removal of this decay heat is not only with the sum total of heat removal, but also the localized problem of generally uniform heat removal to avoid hot spots and local melting down of the cladding and structure of the fuel elements.

During decay heat removal, it is important to have an adequate flow through the reactor to remove this heat and also adequate distribution of the flow to prevent any local high temperature areas. Two-phase flow produces distribution problems in various parallel paths and produces a two-phase moderating condition for which a superficial pressure reactor cannot readily be designed. Varying voids in different elements will produce local hot spots both during normal operation and during decay heat removal.

SUMMARY OF THE INVENTION

In my invention a flash tank is located so that it may intercept all the flow between the first high pressure water heating pass through the reactor and the second steam superheating pass. During shutdown of the unit the heated high pressure fluid passes to the flash tank where its pressure is decreased providing flash steam. This flash steam is then used to drive the feed pump turbine to supply water to the supercritical pass and is also used to supply a single-phase coolant to the superheater pass. When the quantity of steam flashed is not sufficient to meet both requirements, the turbine used for the feed pump drive is arranged so that the discharge steam from this turbine passes through the nuclear superheater. The feed pump turbine is normally driven with extraction steam from a main steam turbine.

BRIEF DESCRIPTION OF THE DRAWING

The drawing is a schematic representation of a supercritical pressure superheat steam nuclear steam electric plant illustrating the location of the flash tank, the steam driven feed pump and the supplementary piping for functioning in accordance with my invention.

DESCRIPTION OF THE PREFERRED EMBODIMENT

Feed water pump 2 is a centrifugal pump which draws water from the condenser 4 and supplies it to the first pass 6 at supercritical pressure. This pass comprises a plurality of parallel flow paths through the reactor core 8. Recirculating pump 10 and recirculating line 12 are supplied to permit the maintenance of adequate velocities within the first pass through the core. During normal operation the water is heated in this pass to a temperature of approximately 780° F. at a pressure of about 3,700 p.s.i. and is conveyed through connecting pipe 14 to the second or superheating pass 16. This superheating pass comprises a plurality of flow paths through a second portion of the core 8 and as illustrated does not employ recirculation. The through-flow steam heated to a temperature of 1000° F. and at a pressure of about 3,600 p.s.i. passes through the steam outlet line 18 to the main steam turbine 20. Turbine throttle valve 22 operates to control the flow rate, while the turbine is directly connected to electric generator 24 for the generation of electric power. Steam exhausting from the turbine is condensed in condenser 4.

Shutoff valve 26 is located in the connecting line 14 intermediate the first pass 6 and the second pass 16. Flask tank 27 is located in parallel flow relation with the shutoff valve 26 and has extraction line 28 and pressure controlled extraction valve 29 which operate to convey effluent from the first pass to the flash tank. Valve 29 is regulated to maintain a single-phase in the fluid passing through the first pass 6. This requires supercritical pressure when the enthalpy of the leaving fluid exceeds about 850 B.t.u.'s per pound. At lower enthalpy the pressure may be reduced so as to reduce the feed pump power requirements at times when relatively little flash steam is available. A proper pressure may be determined by sensing the temperature and then maintaining the pressure at about 100 p.s.i. in excess of saturation pressure. This is accomplished automatically with temperature sensor 30 sensing the temperature and passing a corresponding control signal to function generator 31. This function generator then emits a control signal which represents the desired pressure above the corresponding saturation pressure to point 32. The pressure is sensed by a pressure sensor 33 which passes a control signal representing the sensed pressure to point 32. Here at point 32 the signals are compared and a control signal representing any error passes through control line 34 through a valve operator to operate valve 29 to regulate throttling to obtain the desired pressure.

Steam line 35 together with steam admission valve 36 operates to convey flash steam from the tank through the steam admission line to the second pass 16. Overpressure valve 38 operates to relieve any excess pressure in the flash tank 27 by passing steam through overpressure line 40 to the condenser 4. This valve 38 may be an automatic pressure regulating valve set at or slightly below the design pressure of the flash tank 27.

A water drain valve 42 is operated to maintain a water level in flash tank 27 and operates by discharging any excess water through the water drain line 44 to the condenser 4.

Feed pump 2 is driven by an auxiliary turbine 52 which, during normal operation, obtains steam through steam extraction line 54 from the main turbine. Auxiliary steam turbine valve 56 is operated to control and isolate steam from the extraction line. The normal discharge from the auxiliary turbine 52 passes through normally open discharge valve 58 through the discharge line 60 to the condenser 4.

Flash tank steam may be supplied to the auxiliary turbine through line 62 and valve 64. The steam so supplied is normally discharged through the discharge line 60. Alternate discharge line 66 and alternate discharge valve 68 are supplied so that the discharge from the auxiliary turbine 52, either in part or in total, may be passed through the second pass 16 for cooling of the second pass. Water separator 69 is located at the turbine exhaust so that only steam is passed through the steam line 66, with any water being separated out and passed through the normal discharge valve 58.

A main turbine bypass line 70 and main turbine bypass valve 72 are supplied to bypass steam around the turbine to the condenser 4 from the steam line 18 so as to permit a through-flow through the second pass 16 of the reactor even though the main turbine 20 is not operating.

The temperature increase of the water passing through feed pump 2 is sensed by temperature difference sensor 80 with a control signal passing to the pump recirculating line 82. When the feedwater flow passing through the feed pump 2 is below a safe value, the turbulence in the pump causes overheating which may damage the pump. Therefore, recirculating valve 82 is operated in response to the temperature difference across the pump to permit additional flow which recirculates through feed pump recirculation line 84 to condenser 4 only when the normal feedwater flow is below the minimum safe value.

When the reactor is shut down in an emergency, decay heat is generated and must be removed. The through-flow is continued using feed pump 2 to supply an initial flow in the order of 5 percent of full load flow. At this time stop valve 26 is closed and valve 29 opened so that the effluent from the first pass 6 passes through extraction line 28 to the flash tank 27. Valve 29 is regulated at this time as previously described to maintain single-phase fluid conditions in the first pass 6 through the reactor core. Steam is flashed in this flash tank at low pressure and passed through steam lines 35 and 62 to the feed pump turbine 52 so as to supply the motive energy for pumping feedwater through the reactor. The discharge from the turbine 52 passes through the optional separator 69 which removes water in the event that excess moisture is formed in passing through the turbine, and then through line 66 to the superheating pass 16 through the reactor. Supplementary cooling steam is supplied through steam admission valve 36 to satisfy the cooling requirements for the superheater pass 16. Where sufficient steam is available the entire cooling steam supply may be supplied through valve 36 with the turbine exhaust passing through the discharge line 60 to the condenser 4. The main turbine bypass valve 72 is opened at this time to permit the steam to flow through the steam line 18 and then to the condenser 4.

Maximum steam for cooling and for driving the turbine as a percentage of the through-flow is obtained by maintaining the enthalpy of the fluid leaving the first pass 6 at a condition such that maximum steam will be flashed at low pressure in flash tank 28. The feed pump 2 therefore is regulated to maintain a temperature 50° below normal leaving the first pass or else regulated by decreasing the feedwater flow in response to the amount of water being discharged from the flash tank 28. For instance, the feed pump may be controlled so that approximately 25 percent of the through-flow is discharged as water from the flash tank. As the decay heat removal requirement decreases with time, the feedwater flow is progressively decreased until such a time as no steam is generated and no further through-flow is required.

The first pass effluent will be at excessive temperature if the feedwater flow supplied is too low. On the other hand if too much feedwater is supplied, the first pass effluent will be at such a low enthalpy condition that little or no flash steam may be obtained in the flash tank. Therefore the feedwater flow is regulated at an amount sufficient for cooling but low enough to permit steam to be generated to drive the feed pump turbine. At the same time valve 29 is being regulated so as to obtain the minimum pressure consistent with one-phase conditions and therefore minimum feed pump power requirements. Due to the low flow through the feed pump at this time its efficiency will be relatively low and pump overheating may occur under these conditions. Pump recirculating line 82 therefore comes into operation as required supplying additional flow just sufficient to avoid pump overheating damage.

While I have illustrated and described a preferred embodiment of my invention it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:

1. A powerplant system to facilitate nuclear reactor decay heat removal comprising: a nuclear reactor, having a first pass for heating water at supercritical pressure, and a second pass for superheating steam at supercritical pressure; means for supplying water to said first pass including a feed pump; steam conveying means for conveying heated fluid from said first pass to said second pass; a main steam turbine; means for conveying steam from said second pass to said main steam turbine; a condenser connected to receive steam from said main turbine; valved means for conveying steam from said second pass to said condenser location in parallel flow relation with said main steam turbine; an auxiliary steam turbine driving said feed pump; characterized by: a shutoff valve located in said steam conveying means; a flash tank; an extraction conduit from said conveying means upstream of said shutoff valve to said flash tank; an extraction valve located in said extraction conduit; and an auxiliary turbine supply conduit connected to convey steam from said flash tank to said auxiliary turbine.

2. An apparatus as in claim 1 having also: means for conveying steam from said flash tank to said second steam heating pass.

3. An apparatus as in claim 2 wherein said means for conveying steam to said second pass comprises: means for conveying steam from the exhaust of said auxiliary turbine to said second pass.

4. An apparatus as in claim 3 having a moisture separator connected to receive exhaust steam from said auxiliary turbine; and means for conveying only steam from the separator to said second pass.

5. An apparatus as in claim 1 having also: a steam admission conduit connected to convey steam directly from said flash tank to said second pass; and a steam admission valve located in said steam admission conduit.

6. An apparatus as in claim 5 having also: means for conveying steam from the exhaust of said auxiliary turbine to said steam admission conduit at a location downstream of said steam admission valve.

7. An apparatus as in claim 1 having also: means for sensing the temperature of the fluid leaving said first pass; means for sensing the pressure of the fluid leaving said first pass; means for automatically regulating said extraction valve in response to said temperature and pressure sensing means to regulate the pressure of the fluid leaving said first pass slightly above saturation pressure.

8. An apparatus as in claim 3 having also: a recirculating line connected to convey fluid from a location downstream of said feed pump but upstream of said first pass to a location upstream of said feed pump; a regulating valve in said recirculating line; sensing means to sense overheating of said feed pump; means to control said regulating valve in response to said sensing means so as to obtain sufficient flow through the feed pump to avoid excessive overheating.

9. A method of circulating coolant through a nuclear reactor having a first water heating pass and a second steam heating pass for decay heat removal during shutdown comprising: establishing a flow of water at a first high pressure through the first pass, and removing decay heat from a portion of the reactor; characterized by: throttling the flow of water after passage through the first pass to a second lower pressure to obtain a steam-phase and a water-phase in a flash tank; passing at least a portion of the steam-phase through a turbine for supplying the motive force to establish said flow of water; passing at least a portion of the steam-phase through said second pass for decay heat removal from a second portion of the reactor.

10. A method as in claim 9 including also: regulating the throttling of the flow of water leaving the first pass to maintain the water pressure in the first pass sufficiently high so that only a single-phase condition exists within the first pass.

11. A method as in claim 10 including maintaining the pressure of the fluid leaving the first pass above critical pressure when the enthalpy is greater than 850 B.t.u.'s per pound and maintaining the pressure slightly above saturation pressure corresponding to the fluid temperature at lower enthalpys.

12. A method as in claim 9 wherein said step of passing a portion of the steam-phase through said second pass is accomplished by passing at least a portion of steam from the turbine through said second pass.

13. A method as in claim 12 including the step of removing moisture from the steam leaving said turbine; passing only dry steam to said second pass; and discharging collected moisture to a collection sump.

14. A method as in claim 12 comprising also: passing at least a portion of the steam-phase from said flash tank directly to said second pass in parallel flow relation with the steam flowing through said turbine.

15. A method as in claim 9 comprising also: sensing the temperature of the fluid leaving said first pass; and regulating the steam flow to said turbine in response to said sensed temperature.

16. A method as in claim 9 including also: removing water from said flash tank, determining the water flow rate as related to the total flow entering the flash tank; and regulating the steam flow to said turbine to maintain a selected portion of water flow leaving said flash tank.

17. A method as in claim 15 including using a centrifugal pump to establish the flow of water; establishing a minimum pump flow requirement for each pump operating condition; and recirculating a portion of the pump flow to a location downstream of said pump in such quantities as to maintain a safe minimum pump flow condition.

References Cited
UNITED STATES PATENTS

| | | | |
|---|---|---|---|
| 3,029,197 | 4/1962 | Untermyer | 176—56 X |
| 3,150,052 | 9/1964 | Stoker et al. | 176—56 X |
| 3,167,480 | 1/1965 | West et al. | 176—56 X |
| 3,180,802 | 4/1965 | West et al. | 176—56 X |

RUEBEN EPSTEIN, *Primary Examiner.*

UNITED STATES PATENT OFFICE
CERTIFICATE OF CORRECTION

Patent No. 3,384,550  
May 21, 1968

Frederick J. Hanzalek

It is certified that error appears in the above identified patent and that said Letters Patent are hereby corrected as shown below:

Column 1, lines 50 and 51, "superficial" should read -- supercritical --.
Column 2, line 34, "Flask" should read -- Flash --.

Signed and sealed this 24th day of March 1970.

(SEAL)  
Attest:

Edward M. Fletcher, Jr.  
Attesting Officer

WILLIAM E. SCHUYLER, JR.  
Commissioner of Patents